United States Patent [19]
Girardin

[11] 3,991,643
[45] Nov. 16, 1976

[54] POWER SAW GUIDE ASSEMBLY

[76] Inventor: Gaston A. Girardin, 30 Birge Ave., Windsor Locks, Conn. 06096

[22] Filed: Jan. 21, 1976

[21] Appl. No.: 651,043

[52] U.S. Cl. .............................. 83/564; 83/471.3; 83/486.1; 83/574; 83/581; 83/829
[51] Int. Cl.² ......................................... B27B 9/04
[58] Field of Search .......... 83/564, 574, 829, 471.3, 83/471.2, 581, 743, 745, 486.1, 486

[56] References Cited
UNITED STATES PATENTS

| | | | |
|---|---|---|---|
| 2,502,640 | 4/1950 | Coleman | 83/574 |
| 2,596,524 | 5/1952 | Bridwell | 83/486.1 X |
| 2,833,320 | 5/1958 | Bennett | 83/574 X |
| 3,139,124 | 6/1964 | Hoff | 83/564 |

*Primary Examiner*—Frank T. Yost

[57] ABSTRACT

A power saw guide assembly comprises a base member adapted for mounting on a saw table and having a circular recess in its upper surface. A U-shaped mounting member defined by a plate portion extending between two legs is rotatably and lockably mounted on the base member for rotation about a vertical axis with the plate portion slidably seated against the upper surface of the base member and a cylindrical boss secured to and extending downwardly from the plate portion seated in the circular recess of the base member. An elongated track member has one end thereof disposed intermediate and pivotably secured to the legs of the mounting member for pivotal movement about a horizontal axis; it has a generally U-shaped cross section defined by a web and two legs, the free longitudinal edge of each leg having a longitudinally extending flange projecting inwardly therefrom in spaced parallel relation to the web. An elongated slide member adapted for mounting a power saw thereon is slidably disposed intermediate the track member flanges which are slidably received in longitudinal grooves in opposite vertical side surfaces of the slide member.

4 Claims, 8 Drawing Figures

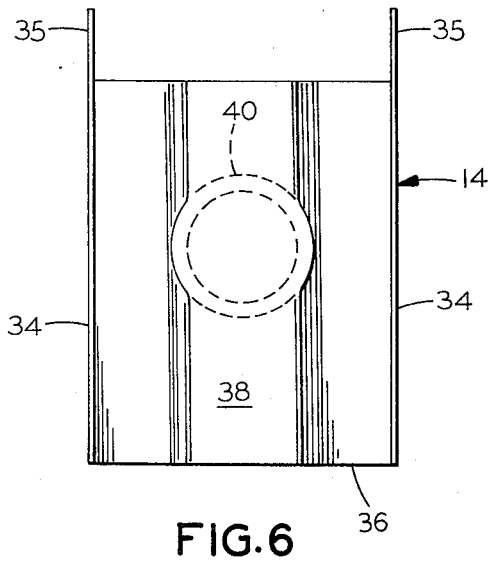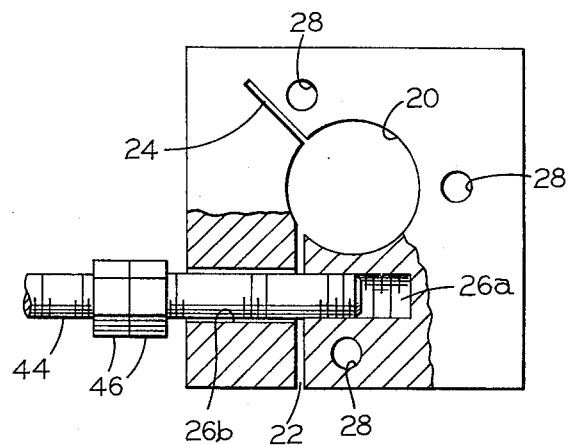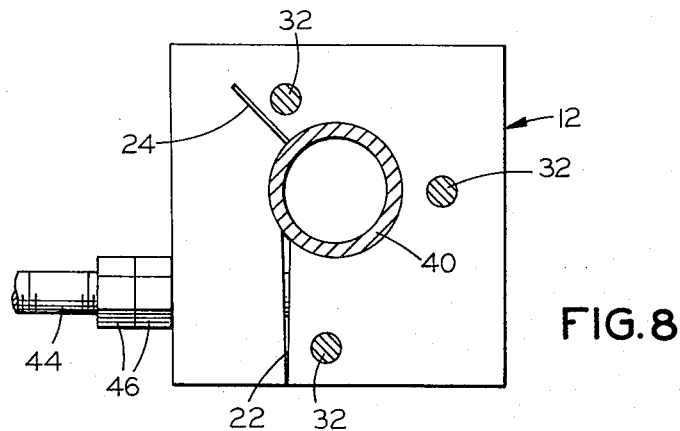

POWER SAW GUIDE ASSEMBLY

BACKGROUND OF THE INVENTION

Guides for facilitating making straight cuts with rotary and saber power saws are well known, and the more sophisticated versions permit miter cuts at adjustable angles and provide for pivoting a portion of the guide upward to facilitate placement and removal of a work piece. Exemplary of such a guide is that of U.S. Pat. No. 2,630,146 issued to S. E. Van Tuyl on Mar. 3, 1953. This guide, however, is not easily adaptable to permit use with power tools having bases of varying widths and has no means for preventing inadvertent movement of the tool vertically of the guide during use.

Applicant and his assignee have attempted to remedy the deficiencies of devices such as those of Van Tuyl by providing a unit which could be mounted on a saw table and permit various angular movement of the several parts. However, heretofore such units have required relatively massive supporting structure and relatively complex fabricating techniques.

Accordingly, it is an object of the present invention to provide a novel power saw guide assembly which is relatively economically manufactured from a minimum number of parts, simple to assemble, and versatile.

It is also an object to provide such a guide assembly which may be used with a wide variety of power saws having bases of varying widths.

Another object is to provide such a guide assembly which constrains a power saw mounted thereon to linear movement.

SUMMARY OF THE INVENTION

It has now been found that the foregoing and related objects can be readily attained in a power saw guide assembly which includes a base member adapted for mounting on saw table or the like and having a recess of circular cross section opening in the upper surface thereof. A mounting member having a generally horizontal plate portion is slidably seated on the upper surface of the base member and a cylindrical boss has its upper end secured to the plate portion and its lower end portion rotatably seated in the recess of the base member so that the mounting member is rotatable relative to the base member about a first axis. An elongated track member has a generally U-shaped cross section defined by two spaced vertical legs with a web extending therebetween, and the free longitudinal edge of each of the legs has a longitudinally extending flange projecting inwardly therefrom in spaced parallel relation to the web to define a channel therebetween. The track member is pivotably mounted at one end to the mounting member by suitable pivot means for pivotal movement about an axis perpendicular to the first axis. An elongated slide member is slidably disposed in the channel of the track member and is adapted for mounting a power saw thereon. This slide member has a pair of vertical side surfaces each having a longitudinal groove therein in which is slidably received one of the flanges of the track member.

In the preferred embodiment, the power saw guide assembly includes means for releasably locking the mounting member to the base member, at the desired relative angular orientation. The mounting member has a generally U-shaped cross section defined by the plate portion and two spaced vertical legs with said one end of the track member being disposed intermediate and pivotably secured to the legs of the mounting member. Conveniently, the legs of the mounting member extend beyond the plate portion at one end thereof to provide a pair of mounting portions, and the pivotable mounting means between the track member and mounting member comprises a fastener extending through aligned apertures in the mounting portions and the legs of the track member.

BRIEF DESCRIPTION OF THE DRAWINGS

FIG. 6 is a plan view of the mounting member of the assembly of FIG. 1 drawn to an enlarged scale with the pivot tube shown in dotted line;

FIG. 7 is a plan view of the base member and eyebolt of the assembly of FIG. 1 drawn to an enlarged scale with a portion of the base member broken away to show internal construction; and FIG. 8 is a sectional view along the line 8—8 of FIG. 3.

DETAILED DESCRIPTION OF THE ILLUSTRATED EMBODIMENT

Figure 1:
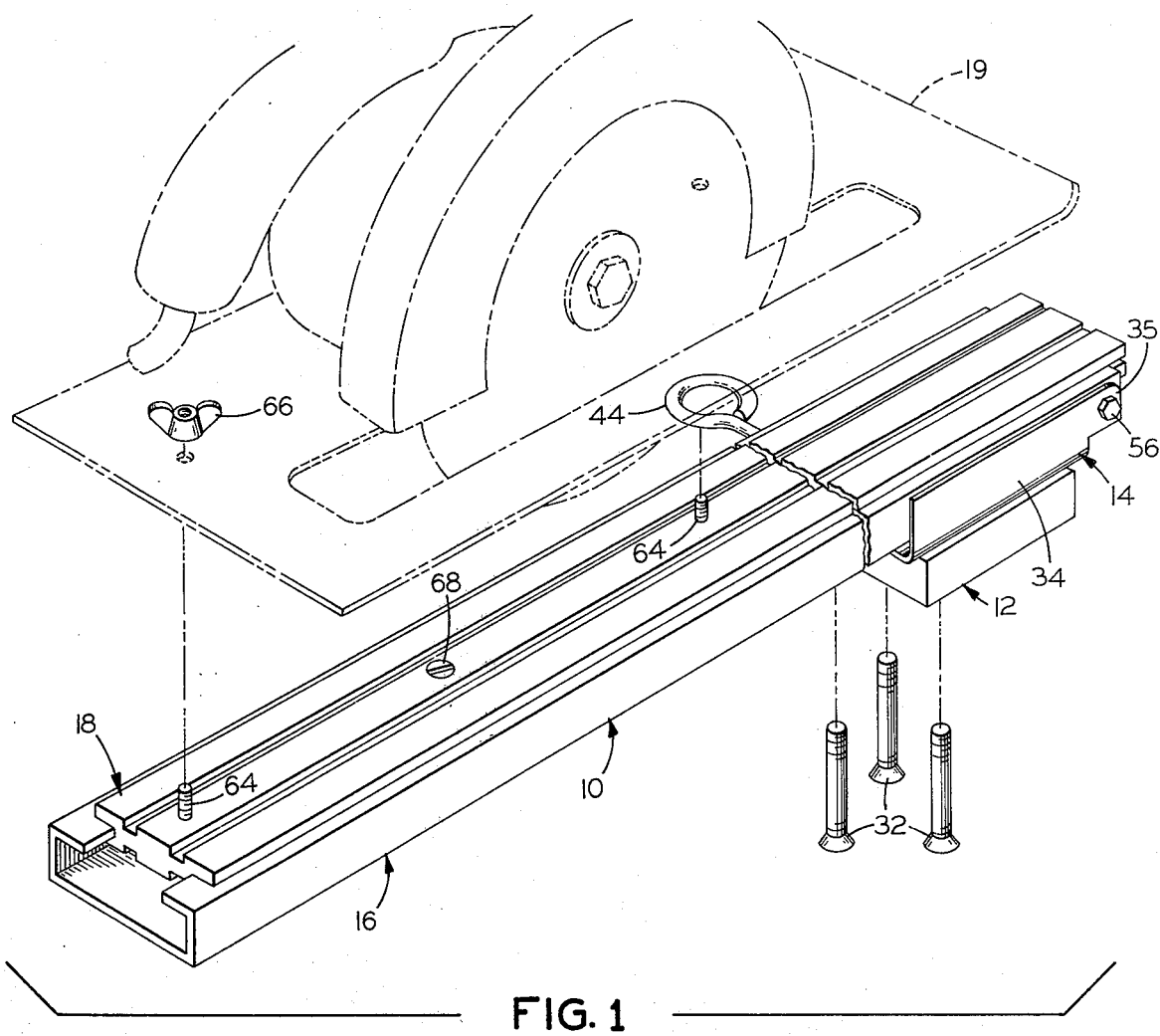
FIG. 1 is a partially exploded perspective view of a power saw guide assembly embodying the present invention with a power saw spaced therefrom and shown in phantom line.

Turning now to the attached drawings in detail, illustrated therein is a power saw guide assembly embodying the present invention generally designated by the numeral 10 which comprises a base member generally designated by the numeral 12 to which is rotatably secured a mounting member generally designated by the numeral 14. An elongated track member generally designated by the numeral 16 is pivotably secured at one end thereof to the mounting member 14, and an elongated slide member generally designated by the numeral 18 and adapted for mounting a power saw 19 thereon is slidably mounted on the track member 16.

Figure 3:
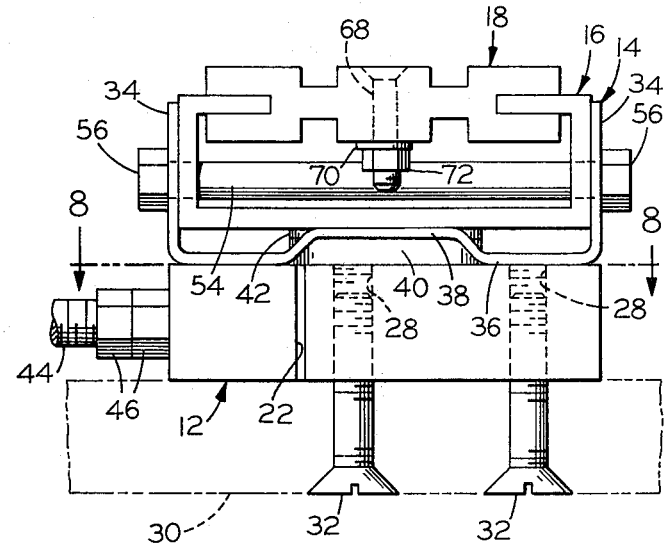
FIG. 3 is an end elevational view of the assembly of FIG. 1 drawn to an enlarged scale as mounted on a saw table fragmentarily shown in phantom line.

The base member 12 is best seen in FIGS. 7 and 8 and has a cylindrical aperture 20 extending therethrough and spaced slots 22, 24, intersecting the aperture 20 secantally. A passage or bore 26 extends transversely of the block through the slot 22 and has a threaded portion 26a and an unthreaded portion 26b. In addition three threaded mounting holes 28 are spaced about the aperture 20 to one side of the slots 22, 24. The function of the slots 22, 24 and passage 26 will be described hereinafter. As seen in FIG. 3, the base member 12 is secured to a saw table 30 or other planar member by bolts 32 extending upwardly through apertures (not shown) in the table 30 into engagement within the threaded holes 28.

Slidably seated upon the upper surface of the base member 12 is the mounting member 14 which may be rotated or releasably locked thereon. The mounting member 14 is generally U-shaped with two spaced vertical legs 34 and a plate portion or web 36 extending therebetween, the plate portion 36 having an upwardly recessed portion 38 stamped out at 42 to provide a seat for a cylindrical boss 40 which is conveniently welded thereto. The legs 34 extend beyond the plate portion 36 at one end thereof to provide ears or mounting portions 35 to facilitate pivotably securing the track member 16 to the mounting member 14 as described hereinafter.

The manner of releasably locking the mounting member 14 to the base member 12 to prevent relative rotation is best seen in FIGS. 7 and 8. An eyebolt 44 is seated in the aperture 26 and is threadably engaged in the portion 26a, a pair of tightly engaged nuts 46 providing a stop and limiting movement of the eyebolt 44 inwardly of the passage 26. The boss 40 of the mounting member 14 is seated in the aperture 20 and is free to rotate when the eyebolt 44 is in the position of FIG. 7. As the eyebolt is threaded into the passage 26, the nuts 46 contact the base member 12 and further rotation flexes a portion of the base member 12 into tightly fitting engagement with the boss 40, this deflection being permitted by the slots 22, 24 as seen in FIG. 8.

Figure 2:
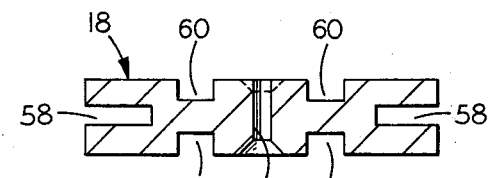
FIG. 2 is a cross sectional view of the slide member of the assembly of FIG. 1 drawn to an enlarged scale.
Figure 2A:
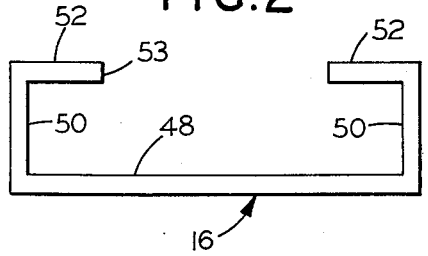
FIG. 2A is an end elevational view of the track member of the assembly of FIG. 1 to the same scale as FIG. 2.

The track member 16, which is pivotably secured at one end thereof to the mounting portions 35 of the mounting member 34, is best seen in FIGS. 1–3 and is of channel-shaped configuration with a horizontal web 48 and vertical legs 50 having a flange 52 extending inwardly thereof in spaced parallel relation to the web 48 to define a channel 53 therebetween. The track member 16 is pivotably mounted to the mounting member 14 by passing a bolt 54 through aligned apertures (not shown) in the mounting portions 35 of the mounting member 14 and end portions of the legs 50 of the track member 16 and securing the bolt in position with nuts 56.

Slidably disposed in the channel 53 of the track member 16 is the slide member 18, which has a longitudinal groove 58 in each of the side surfaces thereof which slidably receives one of the flanges 52 of the track member 16. The slide member 18 and saw 19 are thus constrained to linear movement and there is no appreciable likelihood that the saw 19 will inadvertently move upwardly of the assembly during use.

The slide member 18 has longitudinal grooves 60 to reduce mass and cost and it has apertures 62 (only one of which is shown in FIG. 3) therethrough which receive the threaded fasteners 64 for mounting the saw 19 thereon, wing nuts 66 engaging the fasteners 64 to secure the saw 19 in position. With reference to FIGS. 1 and 3, the slide member 18 also has an aperture (not shown) in which is seated the threaded fastener 68 which is secured in position by the washer 70 and nut 72, these elements providing a stop which contacts the bolt 54 to limit longitudinal movement of the slide member 18 and saw 19.

The manner of using the power saw guide assembly 10 is best described by reference to FIGS. 4 and 5. Initially the track member 16 and slide member 18 are pivoted into the raised position shown in phantom line in FIG. 4, and the work piece (not shown) is placed on the saw table 30 against a stop or support member 74. The track member 16 and slide member 18 are then lowered to a horizontal position with the track member 16 abutting the stop member 74. The members 16, 18 are rotated about a vertical axis through the center of the boss 40 to the desired angular orientation (see FIG. 5) and then locked in position by tightening the eyebolt as previously described. Thereafter the cut is made by sliding the saw 19 and slide member 18 across the work piece. The members 16, 18 are then raised, and the cut work piece is removed.

Figure 5:
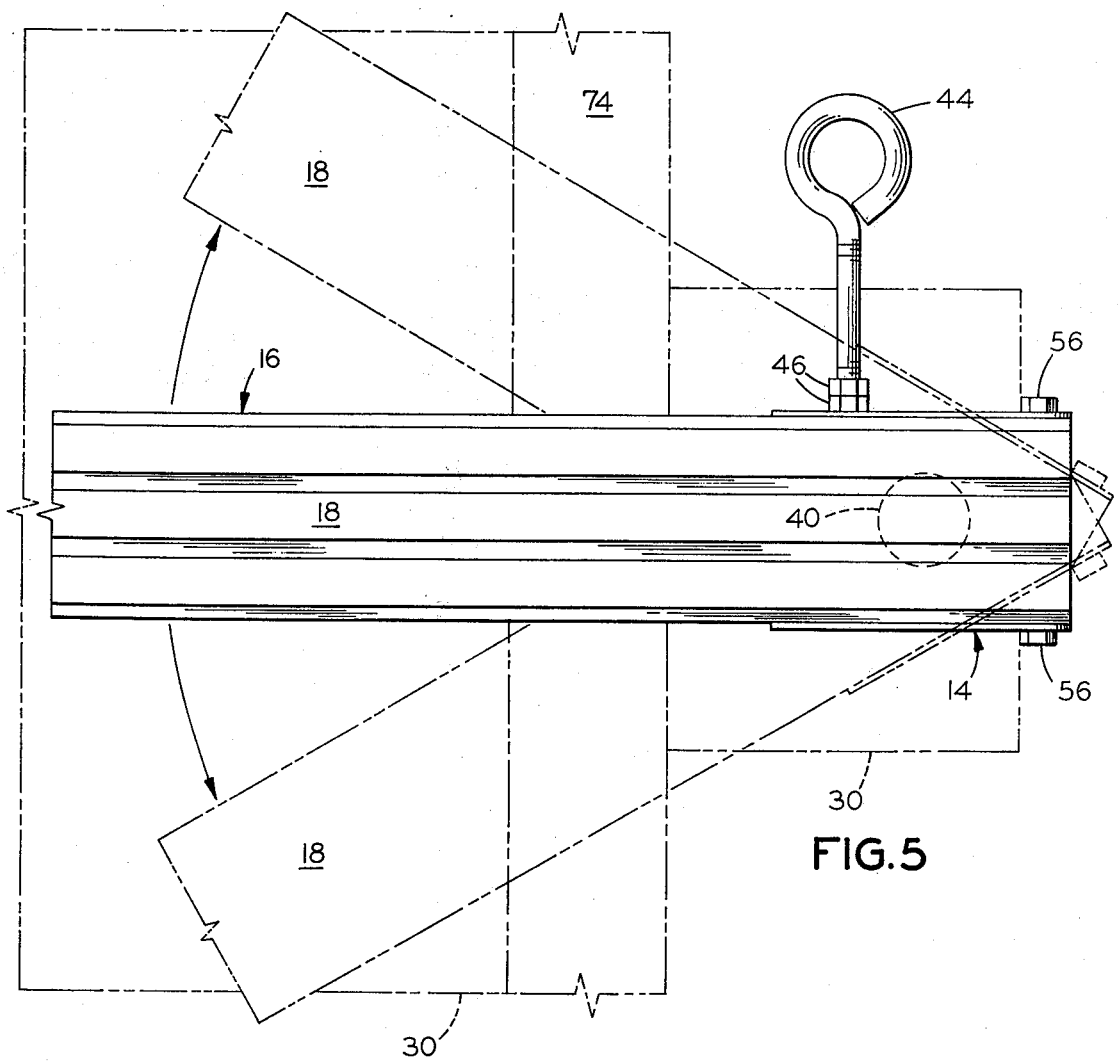
FIG. 5 is a plan view of the assembly of FIG. 4 with phantom lines indicating pivoted positions of the track and slide members.

As seen in FIG. 5, the saw table 30 is conveniently cut away to provide clearance for tightening and loosening the eyebolt 44. The slide member 18 is elongated with the saw 19 mounted adjacent the end thereof opposite the mounting member 14 to facilitate long cuts such as miter cuts at large angles, as the saw 19 and a portion of the slide member 18 may then project beyond the track member 16.

Figure 4:
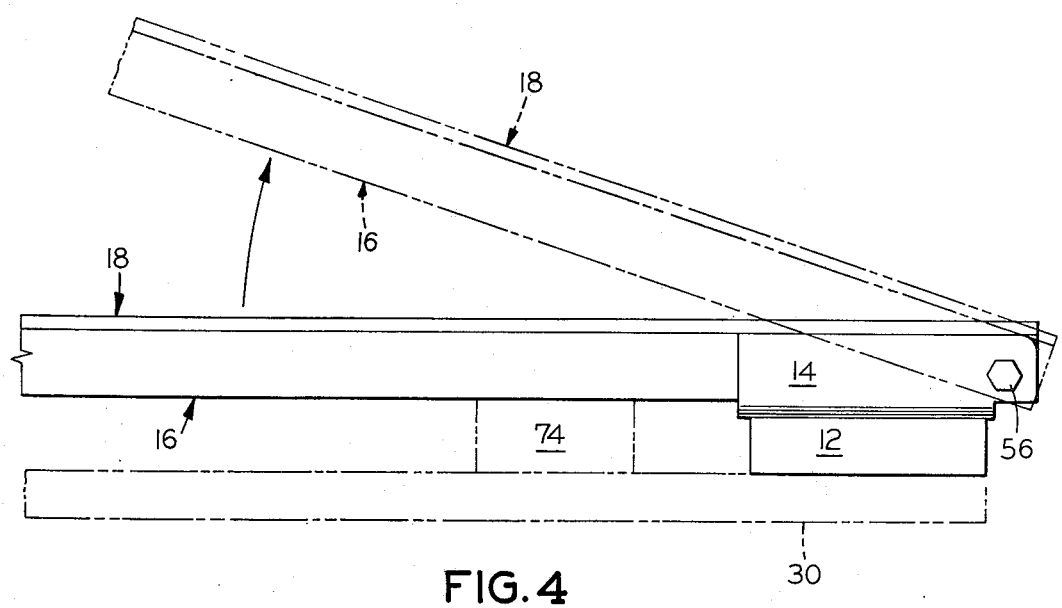
FIG. 4 is a side elevational view of the assembly of FIG. 1 with a saw table and support shown in phantom line and with the track and slide members shown in solid line in a horizontal position and in phantom line in a pivoted position thereof.

The function of the stop provided by the fastener 68, washer 70 and nut 72 (see FIGS. 1 and 3) will be appreciated by reference to FIG. 4. When the track member 16 and slide members 18 are in the raised position, the saw 19 and slide member 18 will be prevented from sliding off the lower end of the track member 16 as the user positions the work piece. Thereafter the saw 19 is in position to be drawn toward the user while making the cut.

In order to cut completely through a work piece, the saw blade of the saw 19 is positioned to cut slightly into the saw table 30 during use, thus possibly necessitating periodic replacement thereof. Alternatively, a thin piece of scrap wood may be placed beneath the work piece or the table may be provided with one or more channels or grooves to permit the blade to rotate therein.

The base, mounting and track members are preferably formed of aluminum with the slide member being plated with a hard metal deposit such as chromium or coated with a low friction resin such as nylon to enhance its slide characteristics, although a wide variety of materials may be used. Instead of plating or coating the slide member, an elongated synthetic resin member having a U-shaped cross section may be seated about each of the flanges of the track member to provide the slides surface. The mounting member is preferably stamped from stainless steel sheet material with the boss being cut from tubular steel stock.

In its preferred aspect, the mounting member is U-shaped, although it may comprise a plate portion with a conventional hinge member pivotably securing the track member thereto. The slide member has a length generally equal that of the track member, although if no long cuts are anticipated, it may be relatively short to provide merely a mount for the saw.

Thus, it can be seen that the power saw guide assembly of the present invention is relatively economically manufactured from a minimum number of parts, simple to assemble, and versatile. It may be used with a wide variety of power saws having bases of varying widths, and constrains such saws to linear movement therealong.

Having thus described the invention, I claim:
1. A power saw guide assembly comprising:
   a. a base member adapted for mounting on a saw table or the like and having a recess of circular cross section opening in the upper surface thereof;
   b. a mounting member having a generally horizontal plate portion slidably seated on the upper surface of said base member;
   c. a cylindrical boss having its upper end secured to said plate portion and its lower end portion rotat- ably seated in said recess of said base member whereby said mounting member is rotatable relative to said base member about a first axis;

d. an elongated track member having a generally U-shaped cross section defined by two spaced vertical legs with a web extending therebetween, the free longitudinal edge of each of said legs having a longitudinally extending flange projecting inwardly therefrom in spaced parallel relation to said web to define a channel therebetween;

e. means pivotably mounting one end of said track member to said mounting member for pivotal movement about an axis perpendicular to said first axis; and f. an elongated slide member adapted for mounting a power saw thereon and slidably disposed in said channel, said slide member having a pair of vertical side surfaces each having a longitudinal groove therein in which is slidably received one of said flanges.

2. The power saw guide assembly of claim 1 further including means for releasably locking said mounting member to said base member at the desired relative angular orientation.

3. The power saw guide assembly of claim 1 wherein said mounting member has a generally U-shaped cross section defined by said plate portion and two spaced vertical legs with said one end of said track member being disposed intermediate and pivotably secured to said legs of said mounting member.

4. The power saw guide assembly of claim 3 wherein said legs of said mounting member extend beyond said plate portion at one end thereof to provide a pair of mounting portions, and wherein said means pivotably mounting one end of said track member to said mounting member comprises a fastener extending through aligned apertures in said mounting portions and said legs of said track member.

* * * * *